US006853755B2

(12) United States Patent
Li

(10) Patent No.: US 6,853,755 B2
(45) Date of Patent: Feb. 8, 2005

(54) METHOD AND APPARATUS FOR ADAPTIVE COMPRESSION OF SCANNED DOCUMENTS

(75) Inventor: Xin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 709 days.

(21) Appl. No.: 09/820,133

(22) Filed: Mar. 28, 2001

(65) Prior Publication Data

US 2002/0168105 A1 Nov. 14, 2002

(51) Int. Cl.[7] .............................. G06K 9/46; G06K 9/00; G06K 9/62
(52) U.S. Cl. ................... 382/239; 382/172; 382/224
(58) Field of Search ....................... 382/168, 170, 382/172, 173, 224, 225, 232, 233, 234, 239, 244, 305; 358/426.14, 505, 539

(56) References Cited

U.S. PATENT DOCUMENTS

| | | | | |
|---|---|---|---|---|
| 5,241,395 | A | * 8/1993 | Chen | 358/426.14 |
| 5,432,870 | A | * 7/1995 | Schwartz | 382/232 |
| 5,778,092 | A | 7/1998 | MacLeod et al. | |
| 5,805,735 | A | * 9/1998 | Chen et al. | 382/239 |
| 5,903,676 | A | * 5/1999 | Wu et al. | 382/244 |
| 6,115,496 | A | * 9/2000 | Nguyen et al. | 382/166 |
| 6,163,625 | A | * 12/2000 | Ng et al. | 382/239 |
| 6,215,904 | B1 | * 4/2001 | Lavallee | 382/234 |
| 6,252,994 | B1 | * 6/2001 | Nafarieh | 382/253 |
| 6,314,208 | B1 | * 11/2001 | Konstantinides et al. | 382/239 |
| 6,324,305 | B1 | * 11/2001 | Holladay et al. | 382/239 |
| 6,366,705 | B1 | * 4/2002 | Chiu et al. | 382/239 |
| 6,563,955 | B2 | * 5/2003 | de Queiroz | 382/239 |

FOREIGN PATENT DOCUMENTS

| | | |
|---|---|---|
| JP | 06020089 | 1/1994 |
| JP | 09238253 | 9/1997 |

OTHER PUBLICATIONS

A. Said and W.A. Pearlman, *An image multiresolution representation for lossless and lossy image compression*, IEEE Trans. on Image Processing, vol. 5, pp. 1303—1310, Sep. 1993.

Taubman et al., *Multirate 3D subband coding of video*, IEEE Trans. on Image Processing, vol. 3, No. 5, pp. 572–588, Sep. 1994.

W. Sweldens, *The Lifting Scheme: A new philosophy in biorthogonal wavelet constructions*, Wavelet Applications in Signal and Image Processing III, pp. 68–79, Proc. SPIE 2569, 1995.

L. Bottou et al., *High quality document image compression using DjVu*, Journal of Electronic Imaging, vol.7, pp.410–425, Jul. 1998.

A. Said and A. Drukarev, *Simplified segmentation for compound image compression*, Proceeding of ICIP 1999.

(List continued on next page.)

*Primary Examiner*—Andrew W. Johns
*Assistant Examiner*—Amir Alavi
(74) *Attorney, Agent, or Firm*—Robert D. Varitz, P.C.

(57) ABSTRACT

A method of compressing a document, includes preparing an encoded representation of a document by scanning the document to provide a scanner output; classifying the scanner output as belonging to a class of document taken from the document classes consisting of smooth, text, graphics and image; and adaptively compressing the scanner output as a function of the class of the document. A compression apparatus for compressing scanned data, includes a scanner for scanning a document and generating a scanner output; a block-based classifier for classifying the scanner output as belonging to a class of documents taken from the document classes consisting of smooth, text, graphics and image; an adaptive compressor for compressing the scanner output according to a compression mode as a function of the class of document; a storage mechanism for storing compressed scanner output and compression mode information; and a decompressor for decompressing compressed scanner output in accordance with the compression mode information.

12 Claims, 7 Drawing Sheets

OTHER PUBLICATIONS

R. L. de Queiroz et al., *Optimizing block–thresholding segmentation for multiplayer compressing of compound images*, IEEE Trans. on Image Processing, vol.9, pp. 1461–1471, Sep. 2000.

M. J. Weinberger, *The LOCO–I lossless image compression algorithm: principles and standardization into JPEG–LS*, IEEE Trans. on Image Processing, vol.9, No.8, pp.1309–1324, Aug. 2000.

* cited by examiner

アジサイ ··· アジサイ ··· アジサイ ··· アジサイ ···
ラベンダー ·· ラベンダー ·· ラベンダー ·· ラベンダー ··
ドライフラワー ドライフラワー ドライフラワー ドライフラワー
ガラスビン ·· ガラスビン ·· ガラスビン ·· ガラスビン ··
ポプリ ······ ポプリ ····· ポプリ ····· ポプリ ·····
グルーガン ··· グルーガン ··· グルーガン ··· グルーガン ···
  (a)        (b)        (c)        (d)

(a)        (b)        (c)        (d)

花の女　　花の女　　花の女
でも最　　でも最　　でも最
イフラ　　イフラ　　イフラ
 (a)　　　 (b)　　　 (c)

METHOD AND APPARATUS FOR ADAPTIVE COMPRESSION OF SCANNED DOCUMENTS

FIELD OF THE INVENTION

This invention relates to scalable lossy compression of scanned documents. Its applications include intelligent document management system, electronic delivery and reproduction of documents through the Internet.

BACKGROUND OF THE INVENTION

This invention deals with the problem of lossy coding of scanned documents, i.e., scanned documents are compressed to a significantly reduced bit rate at the price of a degradation in quality. Current popular approaches, such as that described by L. Bottou et al., High quality document image compression using DjVu, Journal of Electronic Imaging, Vol.7, pp.410–425, Jul. 1998, and R. L. de Queiroz et al., Optimizing block-thresholding segmentation for multi-player compressing of compound images, IEEE Trans. on Image Processing, Vol.9, pp. 1461–1471, September 2000, both belong to the so-called Mixed Raster Content (MRC)-based approaches. They decompose a document into background, foreground and mask layers, and then compress each layer separately. The principle weakness with such layer-based approach is its intrinsic redundancy. Meantime, the rate control and the scalability feature are not efficiently handled in layer-based approaches.

U.S. Pat. No. 5,778,092, to MacLeod et al. granted Jul. 7, 1998, for Method and apparatus for compressing color or gray scale documents, describes a technique for compressing a color or gray scale pixel map representing a document.

A. Said and A. Drukarev, Simplified segmentation for compound image compression, Proceeding of ICIP 1999, discusses the relative advantages of object-based, layer-based and block-based segmentation schemes.

M. J. Weinberger, The LOCO-I lossless image compression algorithm: principles and standardization into JPEG-LS, IEEE Trans. on Image Processing, Vol.9, No.8, pp.1309–1324, August 2000, describes the LOw COmplexity LOssless COmpression for Images (LOCO-I) compression algorithm.

SUMMARY OF THE INVENTION

A method of compressing a document, includes preparing an encoded representation of a document by scanning the document to provide a scanner output; classifying the scanner output as belonging to a class of document taken from the document classes consisting of smooth, text, graphics and image; and adaptively compressing the scanner output as a function of the class of the document.

A compression apparatus for compressing scanned data, includes a scanner for scanning a document and generating a scanner output; a block-based classifier for classifying the scanner output as belonging to a class of documents taken from the document classes consisting of smooth, text, graphics and image; an adaptive compressor for compressing the scanner output according to a compression mode as a function of the class of document; a storage mechanism for storing compressed scanner output and compression mode information; and a decompressor for decompressing compressed scanner output in accordance with the compression mode information.

An object of the invention is to provide an efficient engine and method for compressing the data file of a scanned document.

Another object of the invention is to provide a compression technique which is a function of the type of subject matter contained in the scanned document.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1(*a*)—smooth; FIG. 1(*b*)—text; FIG. 1(*c*)—graphic; and FIG. 1(*d*)—image.

DETAILED DESCRIPTION OF THE PREFERRED EMBODIMENTS

Figure 1A:
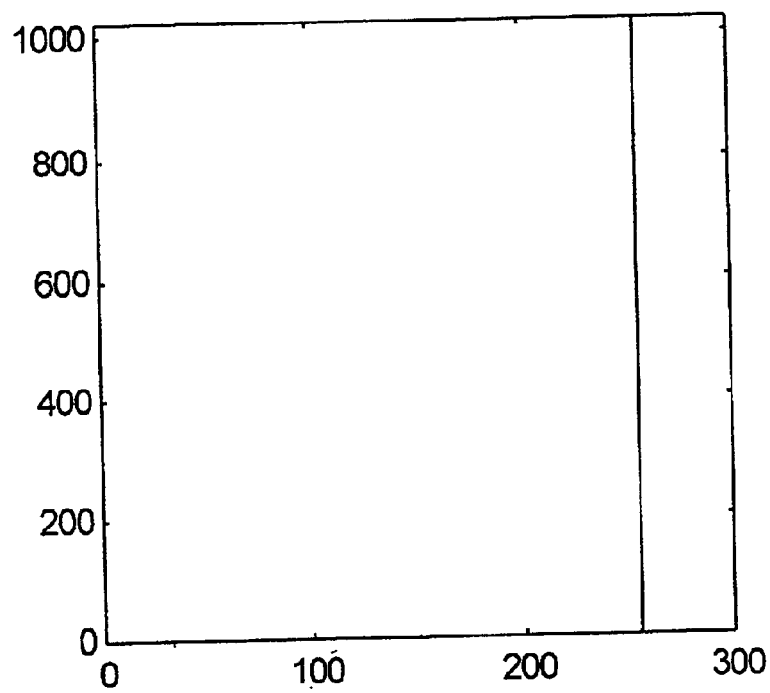
FIG. 1. The histogram of blocks belonging to different document classes.
Figure 1B:
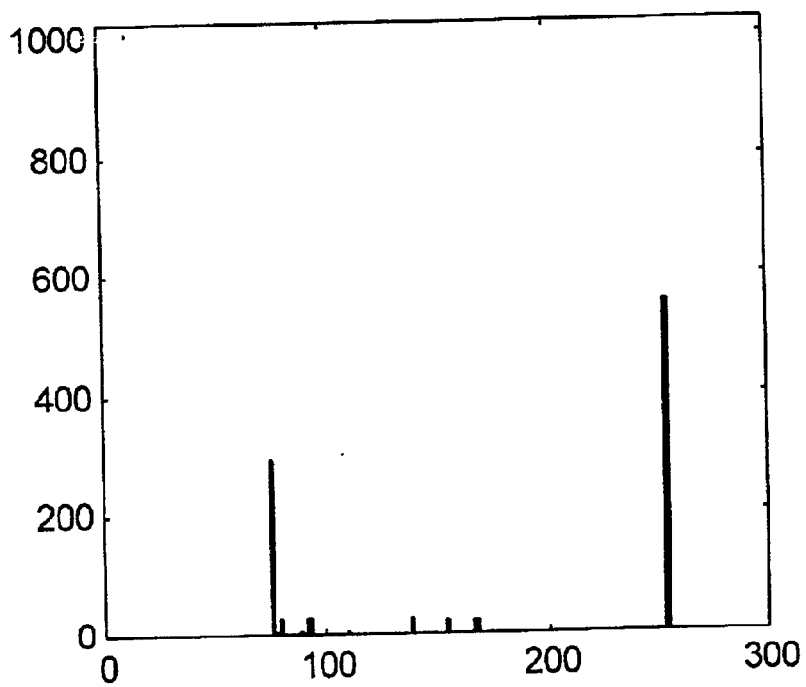
Figure 1C:
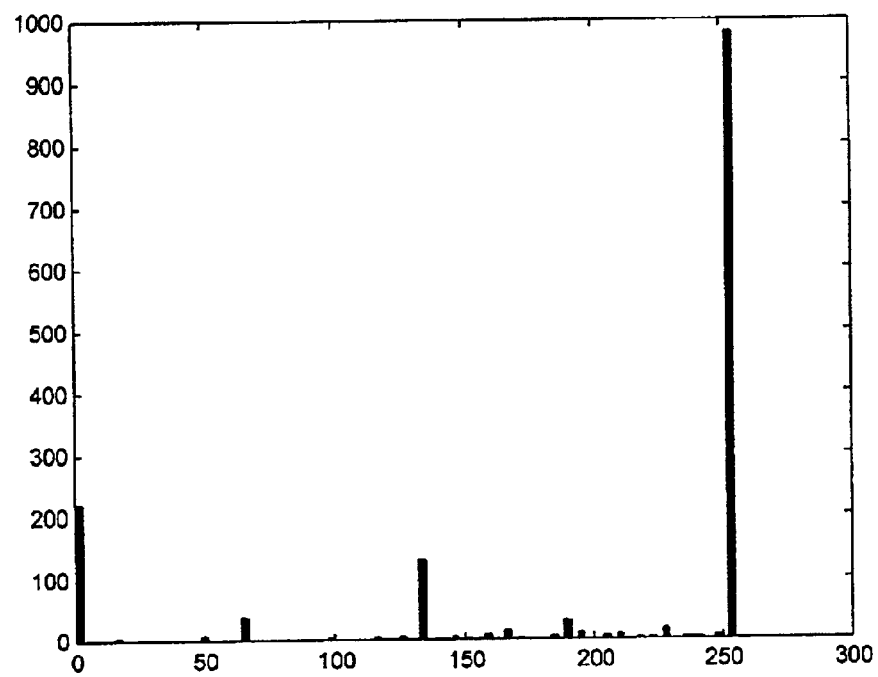
Figure 1D:
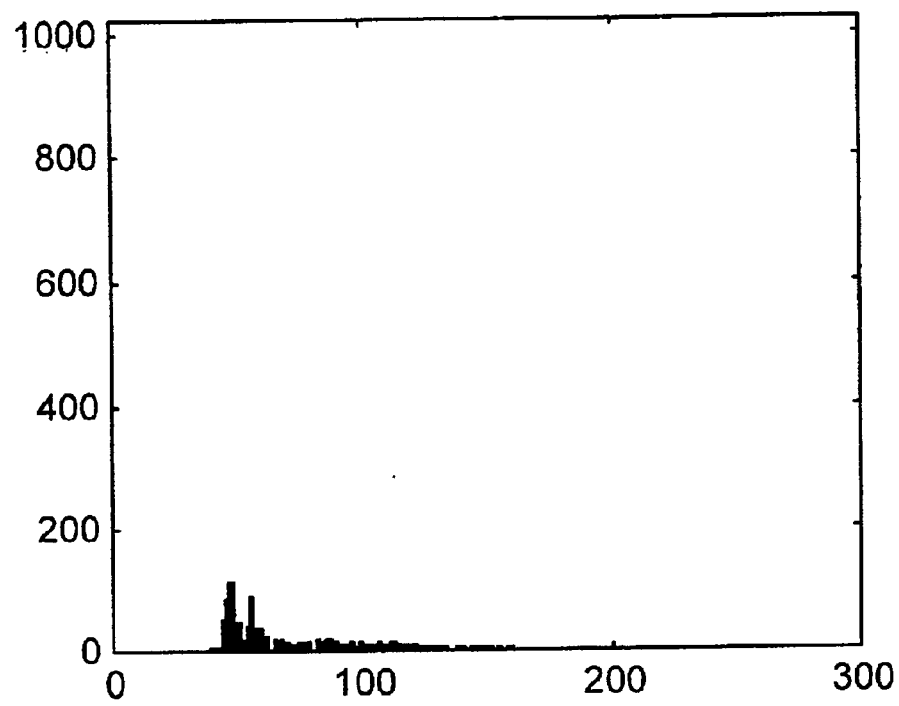

The Block-based Classification and Adaptive Compression (BCAC) coder of the invention provides a novel solution to the lossy compression of scanned documents. It structures the image into non-overlapping blocks and does the classification on a block-by-block basis. Depending on the classification results, the block is adaptively compressed using one of four different standard compression methods: singular mode, binary mode, M-ary mode and continuous mode. All of the generated symbols are coded by an adaptive binary arithmetic coder (QM-coder). The overall complexity is kept comparable to that of JPEG-2000. The BCAC coder and method of the invention include two stages: a block-based classification stage and an adaptive compression or coding stage, which are separately detailed as follows:

Block-based Classification

The classification is based on empirical statistics collected from the data within the block. FIG. 1 depicts several examples of typical histograms, showing pixel value on the x-axis and frequency count on the y-axis, of the blocks belonging to different classes: FIG. 1(*a*)—smooth class, e.g., having only one dominant value; FIG. 1(*b*)—text class, e.g., having two dominant values; FIG. 1(*c*)—graphic class, e.g. having more than two dominant values; and FIG. 1(*d*)—image class, e.g. having no dominant values. Depending on whether there is only one or no dominant value in the distribution, the smooth blocks (FIG. 1(*a*)) and the image blocks (FIG. 1(*d*)) may be identified. The distinction between a text block (FIG. 1(*b*)) and a graphics block (FIG. 1(*c*)) is subtle because the anti-aliasing effect found around the text regions may introduce a false mode detection. One way to overcome such difficulty is to exploit the contrast information. A block is classified as a text block only if its contrast is larger than a preselected contrast threshold, Th. Meanwhile, to facilitate the following coding stage, the classification method of the invention enforces the following order of priority to the classification: smooth>text>graphics>image. Such selection of ordering priority is the result of observations that compressing a block in a dominant value with a higher priority than warranted seriously affects the visual quality of the block upon decompression. For example, when a graphics block is coded in binary mode, one or more colors may disappear.

Based on the above discussion, a sequential classification scheme is used. The classification is summarized into the following sequential three steps:

1) The histogram function, f(c), and the max/min values within a B×B block are obtained. If the difference between max and min is below a preselected threshold, e.g., 8, the block is classified as a smooth block. A pixel value c is said to be dominant if f(c)>f(c+1) and f(c)>f(-1) and f(c)>$th_1$=0.1, where $th_1$ is the threshold for determining a dominant value.

2) Otherwise, the first two dominant values $c_1$, $c_2$ are found and the cumulative probability, p (summation over [$c_1$-A, $c_1$+A] and [$c_2$-A, $c_2$+A]) are calculated. If |$c_1$-$c_2$|>128 and p>Th, the block is classified as a text block.

3) Otherwise, all valid dominant values are found and the cumulative probability is calculated. If the number of dominant values n belongs to [1, M] and the cumulative probability p (summation over all [$c_k$-A, $c_k$+A] for k=1, . . . , n)>$th_2$, where $th_2$ is the threshold used to distinguish graphic block from image blocks, the block is classified as a graphics block. Otherwise, the block is classified as an image block.

Figure 2:
FIG. 2 depicts an original document to be scanned and compressed.
Figure 3:
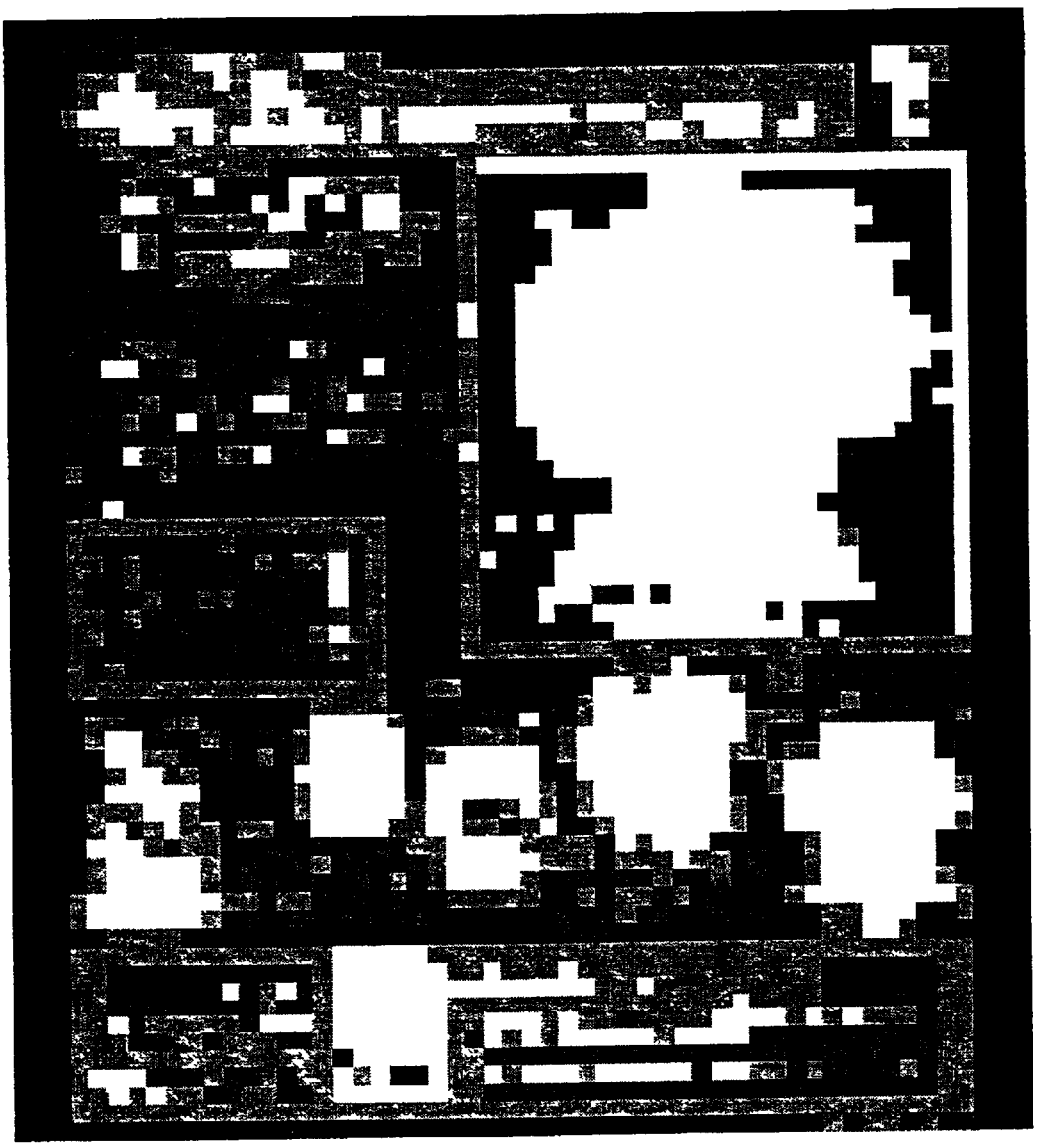
FIG. 3 depicts the classification map for the document of FIG. 2.

FIG. 2 depicts the original test image used to acquire experimental data. The classification results, B=32, A=M=4, and $th_1$=0.10 and $th_2$=0.75, are seen to be reasonably satisfactory. The classification result for each block is explicitly transmitted to the decoder. Therefore the classification is only performed at the encoder. Such asymmetric structure is desired in many real applications, e.g., browsing scanned documents over the Internet using a rather simple docoder.

Adaptive Compression and Coding

Based on the classification result, the block is compressed in one of the following four modes: singular mode, binary mode, M-ary mode and continuous mode.

Singular mode. The compression of a smooth block is simple. Only the mean value needs to be transmitted to the decoder. Spatial scalability is also straightforward.

Binary mode. The block is first quantized into a binary map and then a progressive JBIG-like coder is used to compress the binary map, JBIG, Progressive bi-level image compression, International Standard, ISO/IEC 11544, 1993. The values of $c_1$, $c_2$ are transmitted to the decoder as the side information. It should be noted that some post-processing technique, e.g., the low-pass filter, described in Table 1, may be used to simulate the anti-aliasing effect at the decoder. A simulation example is provided later herein to demonstrate the visual effect of low-pass filtering on decoded text blocks.

TABLE 1

Low-pass filter simulating the anti-aliasing effect.

| 0 | 1/8 | 0 |
| 1/8 | 1/2 | 1/8 |
| 0 | 1/8 | 0 |

Though the low-pass filter intentionally "blurs" the sharp edge around the text regions, the mean-square error (MSE) value compared to the original image is significantly reduced. The text blocks are also visually closer to the original ones after the postprocessing.

M-ary mode. The coding in this mode is similar to the compression of a palette-based image. Since only a small palette (M=4) is allowed, a direct context-based entropy coding scheme is suitable. If the nearest two causal neighbors are considered, there are $4^2$=16 different contexts in total. Spatial scalability is a more challenging problem in this mode. Classical linear transforms, such as wavelet transforms, fail to preserve level-set and thus do not lead to efficient coding of palette-based images. The approach of extending the famous lifting scheme of W. Sweldens, The Lifting Scheme: A new philosophy in biorthogonal wavelet constructions, Wavelet Applications in Signal and Image Processing III, pp. 68–79, Proc. SPIE 2569, 1995, is used to obtain a level-set preserving multi-resolution decomposition of the palette image. For simplicity, the low-resolution image is obtained directly from the downsampling of the high-resolution image, i.e., s(i, j)=x(2i, 2j). The image s(i, j) is used to predict the other three quarters of the image x(i, j):

$$\hat{x}(2i, 2j+1) = s(i, j),$$

$$\hat{x}(2i+1, 2j) = s(i, j),$$

$$\hat{x}(2i+1, 2j+1) = P[x(2i, 2j), x(2i+1, j), x(2i, 2j+1)]$$

where P[·] is a modified median edge detection predictor, directly using x(2i, 2j) to predict x(2i+1, 2j+1) when no horizontal or vertical edge is detected. The prediction residue is generated by e=x-$\hat{x}$(mod M) and its reversibility is achieved by e=x+$\hat{x}$(mod M). Empirical studies show that the overall bit rate increases by about 10% to 30% with the multi-resolution constraint Continuous mode. Scalable compression of the image block has been extensively studied in recent years. Wavelet-based coders have demonstrated the very best compression performance while offering flexible scalability features. Here, the normalized S+P wavelet transform, described by A. Said and W. A. Pearlman, An image multiresolution representation for lossless and lossy image compression, IEEE Trans. on Image Processing, vol. 5, pp. 1303–1310, September 1993, is used for its computational efficiency. Because the transform works on a block-by-block basis, a symmetric extension technique is used at the block boundaries to alleviate potential block artifacts. Wavelet coefficients are scanned and coded in a bitplane-by-bitplane order. A two-stage coding technique, similar to the LZC coder proposed by Taubman et al., Multirate 3D subband coding of video, IEEE Trans. on Image Processing, Vol. 3, No. 5, pp. 572–588, September 1994, is employed. At the first stage (zero coding), the positions of significant coefficients are first transmitted by a JBIG-like coder, at the second stage (refinement coding), the magnitude of significant coefficients are coded after a binary expansion. In order to keep the overall computational complexity low, no rate-distortion optimization technique is used.

Results

Figures 4, 5:
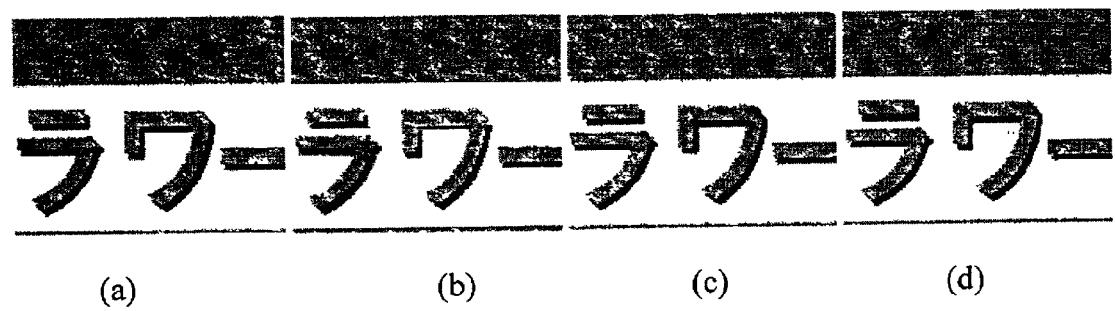
FIG. 4 depicts a comparison of an original text document (FIG. 4(*a*)), and decoded prints of the text after processing by the BCAC of the invention (FIG. 4(*b*)), by DjVu (FIG. 4(*c*)), and by JPEG2000 (FIG. 4(*d*)). JPEG 2000 may be found at http://www.jpeg.org/JPEG2000.htm.
FIG. 5 depicts a comparison of an original graphic document (FIG. 5(*a*)), and decoded prints of the text after processing by the BCAC of the invention (FIG. 5(*b*)), by DjVu (FIG. 5(*c*)), and by JPEG2000 (FIG. 5(*d*)).
Figures 6, 7:
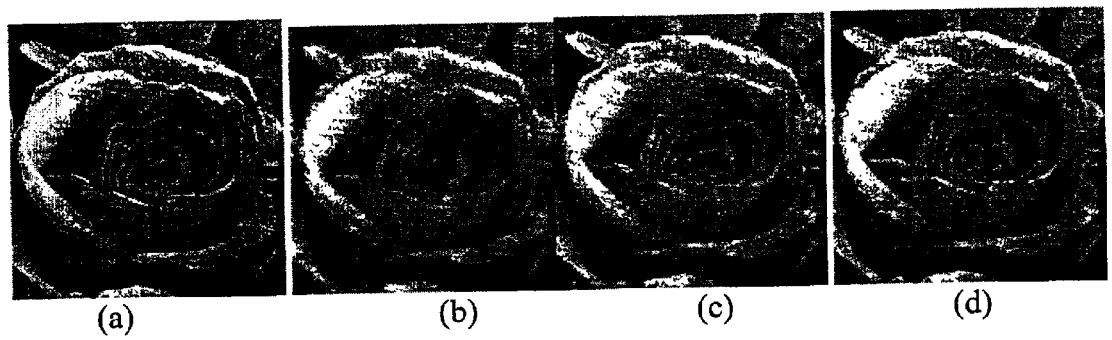
FIG. 6 depicts a comparison of an original image document (FIG. 6(*a*)), and decoded prints of the text after processing by the BCAC of the invention (FIG. 6(*b*)), by DjVu (FIG. 6(*c*)), and by JPEG2000 (FIG. 6(*d*)).
FIG. 7(*a*) depicts an original text region, and the decoded text region before post-processing (FIG. 7(*b*)), and after post-processing (FIG. 7(C)) by the BCAC of the invention.

Using the flower image of FIG. 2, with the size of 1728, or, as used in the actual experiment, 2016, because it contains abundant text/graphic blocks as well as image blocks, the BCAC coder of the invention is compared to the popular DjVu coder and the JPEG2000 VM8 coder. Though the JPEG2000 standard is not developed for compressing compound images, it may be used as a reference in the comparison. In the BCAC coder, all symbols are coded by an adaptive binary arithmetic coder. The overall computational complexity of the BCAC coder appears to be acceptable. For example, it takes around 5 seconds for JPEG2000 or BCAC coder to compress the flower image on a Pentium-III 866M machine, while DjVu requires in excess of 10 seconds. FIGS. 4–6 depicts the original and decoded text, graphic and image regions taken from the decoded image by three the different coders. The actual bytes used by BCAC, DjVu and JPEG2000 are 129234, 138312 and 130622, respectively, which correspond to the bit rate of about 0.3 bpp. The PSNR results achieved by BCAC, DjVu and JPEG2000 are 27.8 dB, 21.0 dB and 31.4 dB, respectively. Though JPEG2000 achieves the highest PSNR result, its subjective quality is not the best. Indeed PSNR values do not faithfully reflect the visual quality of a compound image especially for the text and graphics blocks. It is easy to observe that the BCAC coder achieves much better performance than DjVu and JPEG2000 coders in terms of subjective quality. Because the quality of text/graphics blocks are preserved by a handful of bits, more bits may be spent to code the image blocks and achieve better visual quality. In FIG. 7, the text blocks before and after post-processing are compared. The block after the low-pass filtering is seen to more accurately represents the original block. The PSNR improvement is about 2.3 dB.

Figure 8:
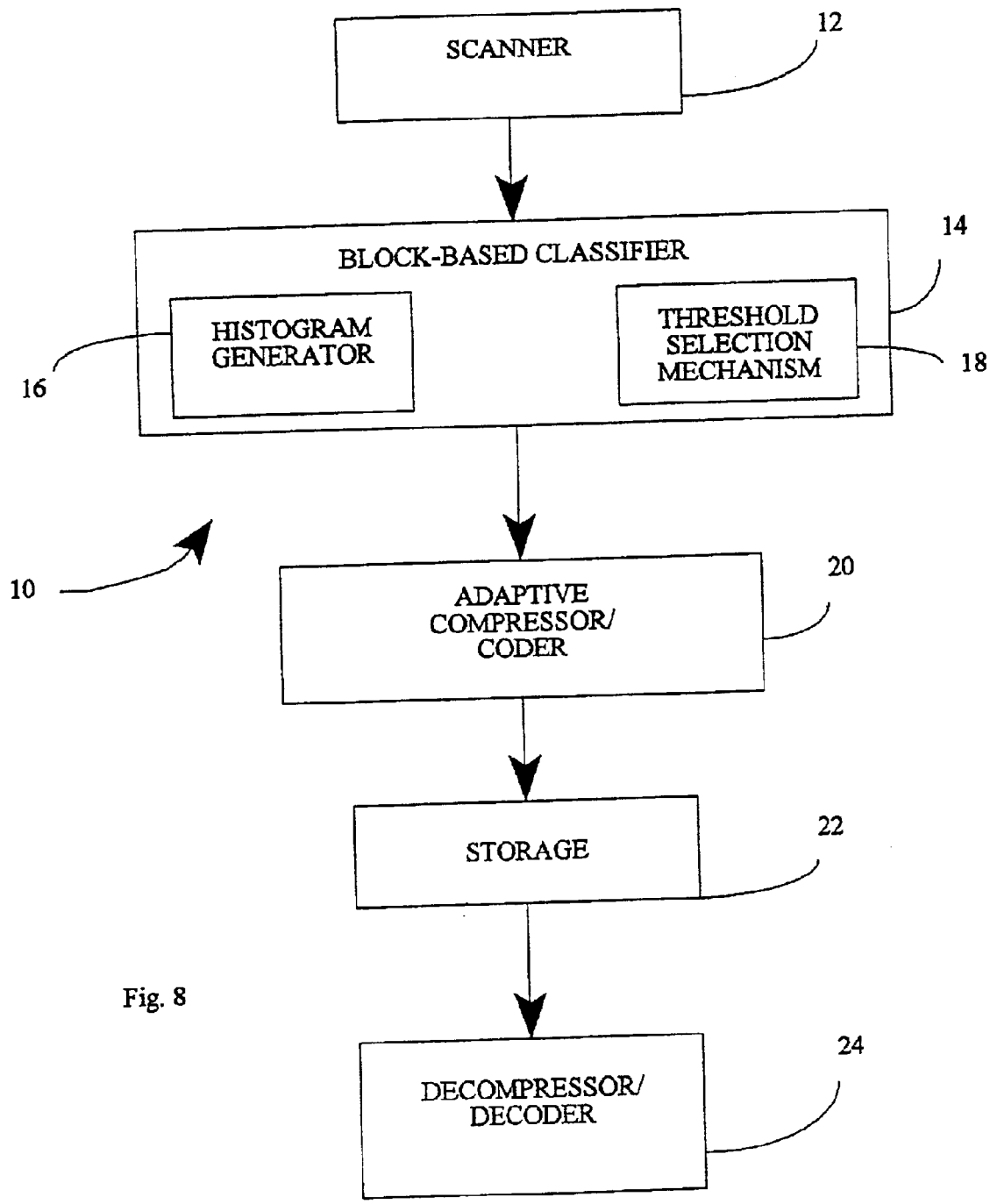
FIG. 8 is a block diagram of the apparatus of the invention.

The BCAC coder apparatus of the invention is depicted in FIG. 8, generally at 10. A scanner 12 provides a scanner output in the form of a file containing the digital data generated from the document in question. A block-based classifier 14 includes histogram generator 16 and a threshold selection mechanism 18. The threshold selection mechanism is most likely a manual input device, wherein a uses sets the various contrast threshold values. Classifier 14 provides an output which includes the scanner output and a flag to identify the class of document associated with the scanner output.

An adaptive compressor, or coder 20, applies the proper compression mode to the scanner output, which mode is associated with the scanner output. The scanner output and the compression mode may be stored in a storage device 22. The compressed scanner out put and the mode information is directed to a decompressor/decoder for processing to "revive" the document.

Though the coder of the method of the invention is designed for compressing scanned documents that contain significant noise, it is also applicable to the lousy compression of computer-generated documents that have little noise. Meanwhile, it is easy to generalize this scheme to compress color documents. Spatial scalability is an attractive feature provided by this approach. Reproduction of the scanned documents at various resolutions is useful in many important applications, e.g., intelligent document management systems can render scanned documents at the resolutions specified by the user.

Thus, a method and apparatus for compressing scanned documents has been disclosed. It will be appreciated that further variations and modifications thereof may be made within the scope of the invention as defined in the appended claims.

I claim:

1. A method of compressing a document, comprising:
   preparing an encoded representation of a document by scanning the document to provide a scanner output;
   classifying the scanner output as belonging to a class of document taken from the document classes consisting of smooth, text, graphics and image, including setting an order of priority to the classification of smooth>text>graphics>image; and
   adaptively compressing the scanner output as a function of the class of the document.

2. The method of claim 1 wherein said classifying includes:
   generating a histogram of the scanner output and identifying maximum and minimum values for the scanner output;
   selecting contrast threshold values to identify a text class document and a smooth class document; and
   using a sequential classification scheme:
   classifying a document as smooth when the difference between the maximum and minimum histogram value is below the contrast threshold value for smooth class documents;
   classifying a document as text when $|c_1-c_2|>128$ and p>the contrast threshold value for text, wherein two dominant values, $c_1,c_2$, are found and the cumulative probability, p is the summation over $[c_1-A, c_1+A]$ and $[c_2-A, c_2+A]$);
   classifying a document as graphic when the number of dominant values n belongs to [1, M] and the cumulative probability p is the summation over all $[c_k-A, c_k+A]$ for k=1, . . . , n)>the contrast threshold value for graphics;
   otherwise, classifying the document as an image for any scanner output not already classified.

3. The method of claim 1 wherein said adaptively compressing includes compressing the scanner output using a compression scheme taken from the group of compression schemes including, singular mode, binary mode, M-ary mode and continuous mode.

4. The method of claim 3 which further includes compressing smooth class scanner output using singular mode compression; compressing text class scanner output using binary mode compression; compressing graphic class scanner output using M-ary compression mode and compressing image class scanner output using continuous mode compression.

5. The method of claim 3 which further includes post processing text class scanner output using a low-pass filter.

6. A method of compressing a document, comprising:
   preparing an encoded representation of a document by scanning the document to provide a scanner output;
   classifying the scanner output as belonging to a class of document taken from the document classes consisting of smooth, text, graphics and image, including:
   generating a histogram of the scanner output and identifying maximum and minimum values for the scanner output;
   selecting contrast threshold values to identify a text class document and a smooth class document; and
   using a sequential classification scheme:
   classifying a document as smooth when the difference between the maximum and minimum histogram value is below the contrast threshold value for smooth class documents;

classifying a document as text when $|c_1-c_2|>128$ and p>the contrast threshold value for text, wherein two dominant values, $c_1,c_2$, are found and the cumulative probability, p is the summation over $[c_1-A, c_1+A]$ and $[c_2-A, c_2+A]$);

classifying a document as graphic when the number of dominant values n belongs to [1, M] and the cumulative probability p is the summation over all $[c_k-A, c_k+A]$ for k=1, . . . , n)>the contrast threshold value for graphics;

otherwise, classifying the document as an image for any scanner output not already classified; and adaptively compressing the scanner output as a function of the class of the document, including compressing the scanner output using a compression scheme taken from the group of compression schemes including, singular mode, binary mode, M-ary mode and continuous mode.

7. The method of claim 6 which further includes compressing smooth class scanner output using singular mode compression; compressing text class scanner output using binary mode compression; compressing graphic class scanner output using M-ary compression mode and compressing image class scanner output using continuous mode compression.

8. The method of claim 7 which further includes post processing text class scanner output using a low-pass filter.

9. A compression apparatus for compressing scanned data, comprising:

a scanner for scanning a document and generating a scanner output;

a block-based classifier for classifying the scanner output as belonging to a class of documents taken from the document classes consisting of smooth, text, graphics and image, including a classification mechanism for classifying a document, having a histogram generator for generating a histogram of scanner output, and a threshold selecting mechanism for selecting contrast threshold values associated with at least two classes of documents;

an adaptive compressor for compressing the scanner output according to a compression mode as a function of the class of document;

a storage mechanism for storing compressed scanner output and compression mode information; and a decompressor for decompressing compressed scanner output in accordance with the compression mode information.

10. The apparatus of claim 9 wherein said block-based classifier includes an order of priority for the classification of smooth>text>graphics>image.

11. The apparatus of claim 9 wherein said adaptive compressor includes compression algorithms, including a singular mode compression algorithm, a binary mode compression algorithm, a M-ary mode compression algorithm and a continuous mode compression algorithm; and wherein smooth class scanner output is compressed using singular mode compression; text class scanner output is compressed using binary mode compression; graphic class scanner output is compressed using M-ary compression mode and image class scanner output is compressed using continuous mode compression.

12. The apparatus of claim 11 which further includes a low-pass filter for use with text class scanner output during post-processing.

* * * * *